(12) United States Patent
Ueno et al.

(10) Patent No.: US 8,733,731 B2
(45) Date of Patent: May 27, 2014

(54) VALVE DEVICE

(75) Inventors: Minoru Ueno, Wako (JP); Tatsuhiro Tomari, Wako (JP)

(73) Assignee: Honda Motor Co., Ltd, Tokyo (JP)

(*) Notice: Subject to any disclaimer, the term of this patent is extended or adjusted under 35 U.S.C. 154(b) by 212 days.

(21) Appl. No.: 13/359,319

(22) Filed: Jan. 26, 2012

(65) Prior Publication Data

US 2012/0193560 A1  Aug. 2, 2012

(30) Foreign Application Priority Data

Jan. 28, 2011  (JP) .................... 2011-017263

(51) Int. Cl.
*F16K 31/02* (2006.01)
(52) U.S. Cl.
USPC ...................... 251/129.06; 60/527
(58) Field of Classification Search
USPC ............ 251/129.01, 129.06; 60/527
See application file for complete search history.

(56) References Cited

U.S. PATENT DOCUMENTS

| | | | |
|---|---|---|---|
| 7,055,796 B2* | 6/2006 | Voss ............ | 251/129.06 |
| 2011/0016705 A1* | 1/2011 | Randazzo et al. ........ | 29/605 |
| 2012/0080980 A1* | 4/2012 | Kaal et al. ............ | 310/331 |
| 2012/0169184 A1* | 7/2012 | Pelrine et al. .......... | 310/365 |
| 2013/0264972 A1* | 10/2013 | Hashimoto et al. ....... | 318/116 |

FOREIGN PATENT DOCUMENTS

| | | |
|---|---|---|
| JP | 05-057551 U | 7/1993 |
| JP | 06-296380 A | 10/1994 |
| JP | 2001-235055 A | 8/2001 |
| JP | 2003-074729 A | 12/2003 |

OTHER PUBLICATIONS

Machine translation for JP 06-296380.*
Machine translation for JP 2001-235055.*
Characteristics Evaluation of PCV Gel Actuator Naoki Ogawa, Minoru Hashimoto, Midori Takasaki and Thshihiro Hirai Oct. 2009.*
Japanese Office Action mailed Feb. 26, 2013, issued in corresponding Japanese Patent Application No. 2011-017263.
Misaki Yamano et al., "Structure and Characteristics of a Contraction Type PVC Gel Actuator," Sep. 2009, JRSJ vol. 27 No. 7, pp. 718-724.

* cited by examiner

*Primary Examiner* — Eric Keasel
*Assistant Examiner* — Ian Paquette
(74) *Attorney, Agent, or Firm* — Westerman, Hattori, Daniels & Adrian, LLP

(57) ABSTRACT

A valve device includes an oil path that is formed such that a hydraulic fluid flows therethrough, a ball valve that opens and closes the oil path, and a contraction-type PVC gel actuator including a plurality of planar cathode plates, a plurality of mesh-like anode plates, and PVC gel layers. The cathode plates and the anode plates are alternately stacked one on top of the other with the PVC gel layers sandwiched therebetween. With expansion or contraction deformation of the contraction-type PVC gel actuator, the ball valve is driven so as to close or open the oil path. The cathode plates and the anode plates included in the contraction-type PVC gel actuator are interconnected using the belt-like wiring portions. Thus, an integrated unit of the plurality of cathode plates and an integrated unit of the plurality of anode plates are formed.

7 Claims, 4 Drawing Sheets

VALVE DEVICE

CROSS REFERENCES TO RELATED APPLICATIONS

The present application claims priority under 35 U.S.C. §119 to Japanese Patent Application No. 2011-017263, filed Jan. 28, 2011, entitled "Valve Device", the contents of which being incorporated herein by reference in their entirety.

BACKGROUND OF THE INVENTION

1. Field of the Invention

The present invention relates to valve devices that are preferably used for hydraulic control in hydraulic equipment such as automatic transmissions installed in vehicles.

2. Description of the Related Art

Today, valve devices equipped with solenoid actuators are used to open and close flow paths of hydraulic fluids for speed control in automatic transmissions installed in vehicles. One example of such valve devices is disclosed in Japanese Unexamined Patent Application Publication 2003-74729. This valve device includes a valve member and a solenoid. The valve member opens and closes an oil path, and the solenoid drives the valve member using a plunger. The oil path is opened or closed by driving the valve member, which is driven by turning on and off an electromagnetic force of the solenoid. Specifically, in such a valve device, when power is turned off, the plunger, which is urged by a spring, pushes the valve member against a sitting surface so as to close the oil path. When the power is turned on, an electromagnetic force of the solenoid causes the plunger to move back against the urging force of the spring. Thus, the valve member moves away from the sitting surface due to the oil pressure of a hydraulic fluid, thereby opening the oil path.

SUMMARY OF THE INVENTION

The valve device equipped with the solenoid actuator as described above includes a variety of members therein such as the metal solenoid and magnets. For this reason, the structure of the valve device is complex, and the number of components, the outer size, and the weight of the valve device are increased. There is also a problem in that the cost of the components is increased. In particular, with respect to an automatic transmission for a vehicle, a plurality of valve devices (typically, about four to six valve devices) having the above-described structure are used in an automatic transmission, thereby further increasing effect on the weight and the cost. In addition, with the above-described valve device, operational noise in opening and closing the oil path becomes larger due to noise generated when the solenoid is driven.

The present invention is proposed in view of the above-described situation. The present invention provides a valve device that has, compared to the related-art valve device equipped with a solenoid, a much simpler structure, and that allows the size, weight, and cost of the valve device to be significantly reduced.

In order to solve the above-described problems, a valve device (1) according to the present invention includes a fluid path (21) through which a fluid passes, a valve member (31) that opens and closes the fluid path (21), and a contraction-type polymer gel actuator (10) that includes a plurality of planar cathode plates (11a), a plurality of mesh-like anode plates (13a), and polymer gel layers (15), in which the plurality of cathode plates (11a) and the plurality of anode plates (13a) are alternately stacked one on top of the other with the polymer gel layers (15) sandwiched therebetween. In the valve device (1), the fluid path (21) is opened and closed by driving the valve member (31), the valve member (31) is driven due to expansion and contraction deformation of the contraction-type polymer gel actuator (10), the expansion and contraction deformation of the contraction-type polymer gel actuator (10) occurs due to control of a voltage applied to the contraction-type polymer gel actuator (10). In the valve device (1), the cathode plates (11a) adjacent to each other are connected to each other using a belt-like wiring portion (11b), and the connected plurality of cathode plates (11a) form an integrated cathode member (11). In the valve device (1), the anode plates (13a) adjacent to each other are connected to each other using a belt-like wiring portion (13b), and the connected plurality of anode plates (13a) form an integrated anode member (13). As the above-described polymer gel, a polyvinyl chloride (PVC) gel formed by adding a plasticizer to PVC may be used.

Thus, because of the above-described structures of the cathode member and the anode member, the cathode member that includes the plurality of cathode plates that are connected to each other using the wiring portion, and the anode member that includes the plurality of anode plates that are connected to each other using the wiring portion can be respectively formed as integrated units by pressing. Accordingly, the valve device equipped with the contraction-type polymer gel actuator that includes the plurality of cathode plates and the plurality of anode plates can be fabricated in a simple process and at a low cost. Since the contraction-type polymer gel actuator having the above-described structure is included, compared to a related-art valve device including a solenoid actuator, the valve device can have a much simpler structure and a much reduced size, can be much lighter in weight, and can be fabricated at a lower cost. In particular, an automatic transmission installed in a vehicle uses a plurality of valve devices for hydraulic control. Thus, the use of the valve device according to the present invention having the above-described structure in the automatic transmission can significantly help reduce the sizes, weights, and costs of the automatic transmission and the vehicle. In the valve device according to the present invention, the valve member is driven due to expansion and contraction deformation of the contraction-type polymer gel actuator. This can eliminate or significantly reduce operational noise generated when the fluid path is opened or closed. Thus, the valve device is very quiet in operation.

Preferably, in the above-described valve device, the wiring portions (11b and 13b) respectively interconnect the adjacent cathode plates (11a) and the adjacent anode plates (13a) while the wiring portions (11b and 13b) are bent. With this structure, because of bending of the wiring portions, the plurality of cathode plates and the plurality of anode plates that are respectively connected to each other using the wiring portions form a bellows shape. This allows the cathode plates and the anode plates to follow deformation of the polymer gel layers. Thus, expansion and contraction deformation of the contraction-type polymer gel actuator can be smoothly performed, and the valve device having good operability and durability can be obtained. Since the wiring portions are bent, there is no possibility of excessive tension being applied to the wiring portions when the polymer gel layers deform. Thus, breaks and other problems in the wiring portions that would occur due to expansion and contraction deformation of the contraction-type polymer gel actuator can be prevented from occurring.

Preferably, the above-described valve device further includes a case (50) that houses the contraction-type polymer gel actuator (10) and has the fluid path (21) formed therein. In this valve device (1), the contraction-type polymer gel actuator (10) has a cylindrical outer shape, the axial direction of the contraction-type polymer gel actuator (10) extends in a direction in which the cathode plates (11a) and the anode plates (13a) are stacked one on top of the other. In this valve device (1), the case (50) has a cylindrical housing portion (56) and groove portions (57). The housing portion (56) houses the contraction-type polymer gel actuator (10), the groove portions (57) are formed at positions corresponding to the wiring portions (11b and 13b) in an inner side surface of the housing portion (56), and the wiring portions (11b and 13b) of the contraction-type polymer gel actuator (10) are housed in the groove portions (57). With this structure, the wiring portions housed in the groove portions of the case function as stoppers that stop rotation of the cathode plates and the anode plates. This can prevent the cylindrical contraction-type polymer gel actuator from rotating in the cylindrical housing portion. Thus, breaks in the wiring portions that would occur due to rotation of the contraction-type polymer gel actuator in the housing portion can be prevented.

Preferably, in the above-described valve device, the groove portions (57) serve as flow paths through which a fluid moving in the housing portion (56) flows. With this structure, the groove portions, which house the wiring portions, function as the flow paths through which fluids such as a hydraulic fluid and air having entered the housing portion move in the housing portion. This allows, when expansion or contraction deformation of the contraction-type polymer gel actuator is performed, fluids such as the hydraulic fluid and air in the housing portion to smoothly move. This also allows the hydraulic fluid and air to be delivered entirely in the housing portion through the grooves portion. Thus, expansion and contraction deformation of the contraction-type polymer gel actuator can be more smoothly performed.

Reference numerals inside parentheses in the above description, which are reference numerals that denote components in an embodiment that will be described later, are indicated to exemplify the present invention with reference to the attached drawing figures.

With the valve device according to the present invention, the structure of the valve device can be much simpler, and the size, weight, and cost of the valve device can be significantly reduced compared to the related-art valve device.

BRIEF DESCRIPTION OF THE DRAWINGS

FIG. 1A is a side sectional view of the valve device, FIG. 1B is a sectional view of the valve device taken along line IB-IB in FIG. 1A, and FIG. 1C is a sectional view of the valve device taken along line IC-IC in FIG. 1A.

FIG. 2A is a perspective view illustrating an overall structure of the contraction-type PVC gel actuator, and FIG. 2B illustrates a cathode member and an anode member.

FIGS. 3A and 3C illustrate a state in which a voltage is not applied to the contraction-type PVC gel actuator, and FIGS. 3B and 3D illustrate a state in which a voltage is applied to the contraction-type PVC gel actuator.

FIG. 4A illustrates a state in which an oil path is closed, and FIG. 4B illustrates a state in which the oil path is opened.

DESCRIPTION OF THE PREFERRED EMBODIMENTS

Figure 1A:
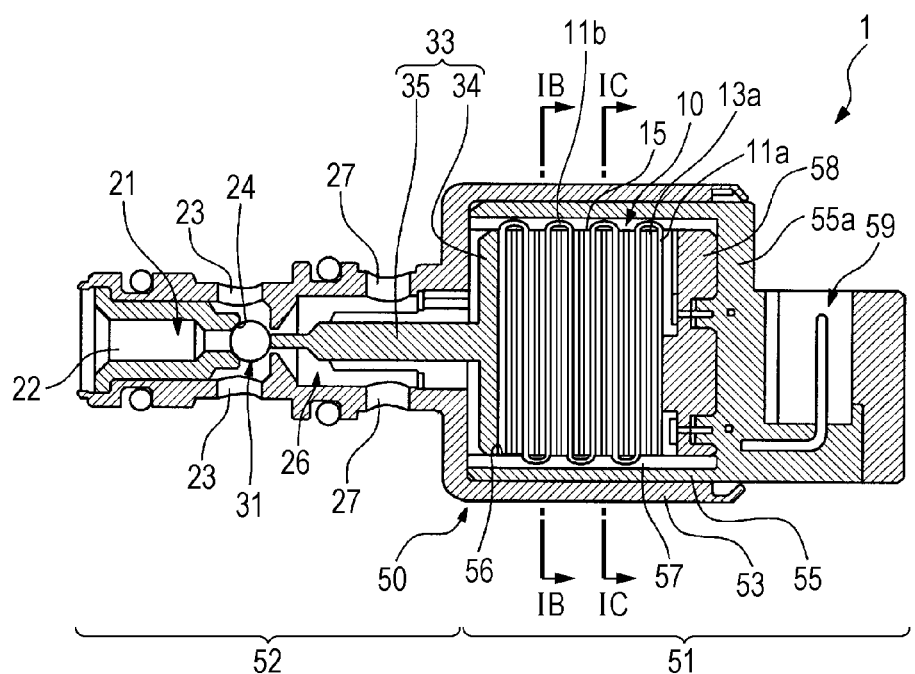
FIGS. 1A to 1C illustrate a valve device according to an embodiment of the present invention.
Figure 1B:
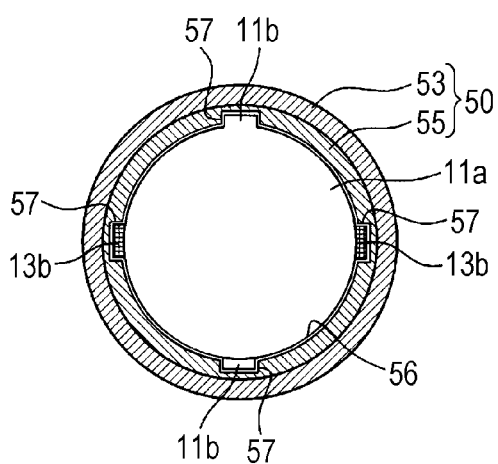
Figure 1C:
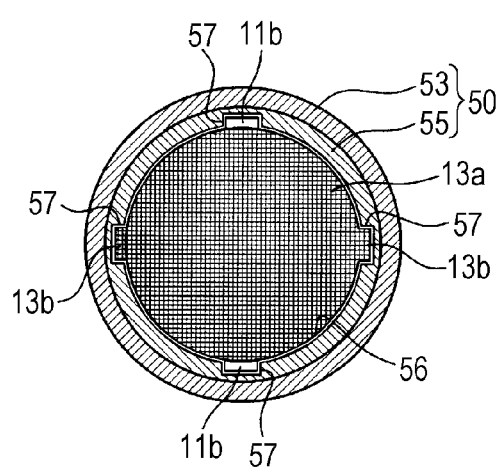

An embodiment of the present invention will be described in detail below with reference to the accompanying drawings. FIGS. 1A to 1C illustrate a valve device 1 according to the embodiment of the present invention. FIG. 1A is a side sectional view of the valve device 1, FIG. 1B is a sectional view of the valve device 1 taken along line IB-IB in FIG. 1A, and FIG. 1C is a sectional view of the valve device 1 taken along line IC-IC in FIG. 1A. The valve device 1 illustrated in FIGS. 1A to 1C is preferably used in an automatic transmission installed in a vehicle in order to control a flow of a hydraulic fluid for speed control. The valve device 1 includes an oil path 21, a ball valve (valve member) 31, a contraction-type polyvinyl chloride (PVC) gel actuator (contraction-type polymer gel actuator) 10, and a case 50. The oil path 21 is formed such that the hydraulic fluid flows therethrough, the ball valve 31 opens and closes the oil path 21, the contraction-type PVC gel actuator 10 drives the ball valve 31, and the case 50 houses the ball valve 31 and the contraction-type PVC gel actuator 10.

The case 50 includes a substantially cylindrically shaped main body portion 51 and shaft portion 52. The shaft portion 52 has a cylindrical shape, the diameter of which is smaller than that of the main body portion 51, and protrudes from an end of the main body portion 51. The main body portion 51 and the shaft portion 52 both include corresponding portions of an integrally formed outer case 53. An inner circumference of the outer case 53 in the main body portion 51 is engaged with an inner case 55 that houses the contraction-type PVC gel actuator 10. The shaft portion 52 has the oil path 21 formed therein. The oil path 21 has an inlet port 22 and outlet ports 23. The inlet port 22 extends from the tip of the shaft portion 52 toward the main body portion 51 side in the axial direction, and the outlet ports 23 radially outwardly extend from a downstream end of the inlet port 22. The spherically shaped ball valve 31 is housed at the downstream end of the inlet port 22, where a valve seat portion 24 is provided in order for the ball valve 31 to sit on the valve seat portion 24. The ball valve 31 moves in the oil path 21 so as to contact the valve seat portion 24 or move away from the valve seat portion 24. By doing this, the oil path 21 is opened or closed.

The main body portion 51 of the case 50 has a double-layer structure that is formed of the outer case 53 and the inner case 55. A cylindrically shaped housing portion 56, which houses the contraction-type PVC gel actuator 10, is formed radially inside the inner case 55. The contraction-type PVC gel actuator 10, which is housed in the housing portion 56, generally has a substantially cylindrical outer shape.

A plunger 33 is disposed between the contraction-type PVC gel actuator 10 and the ball valve 31. The plunger 33 has a plate portion 34 and a rod-shaped needle portion 35. The plate portion 34 contacts an end of the contraction-type PVC gel actuator 10, and the needle portion 35 is formed so as to protrude from the plate portion 34 toward the ball valve 31 side. The tip of the needle portion 35 contacts and presses the ball valve 31. A drain chamber 26 is formed at a position radially inside the shaft portion 52 where the needle portion 35 is housed. The excess hydraulic fluid from the oil path 21 flows into the drain chamber 26. Drain ports 27 are open from the drain chamber 26 in radially outward opposite directions of the shaft portion 52.

Figure 2A:
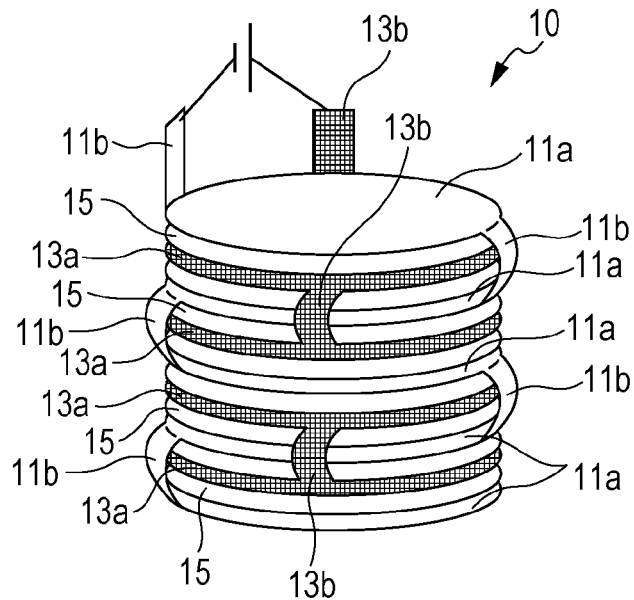
FIGS. 2A and 2B illustrate a contraction-type PVC gel actuator.
Figure 2B:
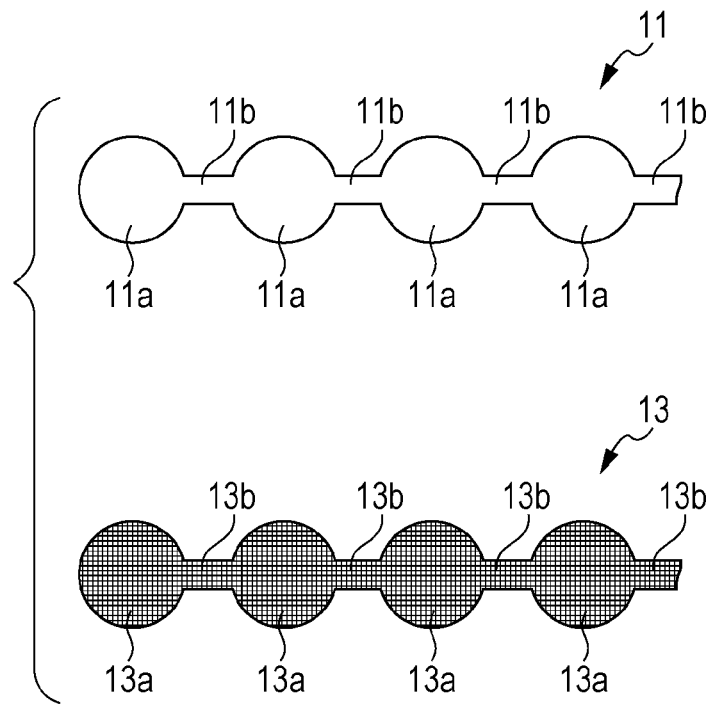

FIGS. 2A and 2B illustrate the contraction-type PVC gel actuator 10. FIG. 2A is a general perspective view illustrating an overall structure of the contraction-type PVC gel actuator 10, and FIG. 2B illustrates a state in which a cathode member 11 and an anode member 13 included in the contraction-type PVC gel actuator 10 are extended. The contraction-type PVC gel actuator 10 is a polymer gel actuator including layers of a PVC gel (polymer gel layers). The PVC gel is formed by adding a plasticizer to PVC. The contraction-type PVC gel actuator 10 also includes a plurality of cathode plates 11a and a plurality of anode plates 13a. The plurality of cathode plates 11a and the plurality of anode plates 13a are alternately stacked one on top of the other with PVC gel layers 15 sandwiched therebetween. Each of the cathode plates 11a has a circular planar shape. Each of the anode plates 13a, the outer shape of which is also a circular planar shape, generally has a vertically and horizontally woven fine mesh-like structure. The basic structure and an operation of the above-described contraction-type PVC gel actuator 10 are disclosed. One example of the disclosure of this technology is as follows: Yamano, M; Ogawa, N; Hashimoto, M; Takasaki, M; Hirai, T. Structure and Characteristics of a Contraction Type PVC Gel Actuator. Journal of the Robotics Society of Japan. 2009, Vol. 27, No. 7, pp. 718-724, the contents of which being hereby incorporated by reference.

The contraction-type PVC gel actuator 10 included in the valve device 1 according to the present embodiment has a following structure in addition to the above-described basic structure. That is, as illustrated in FIG. 2B, the adjacent cathode plates 11a are connected to each other using belt-shaped wiring portions 11b such that the entirety of the plurality of cathode plates 11a forms the single cathode member 11. Likewise, the adjacent anode plates 13a are connected to each other using belt-shaped wiring portions 13b such that the entirety of the plurality of anode plates 13a forms the single anode member 13. The cathode member 11 and the anode member 13 are metal thin plate-shape members, each of which can be formed as a single unit by pressing.

As illustrated in FIG. 2A, in the contraction-type PVC actuator 10 according to the present embodiment, the PVC gel layers 15 are each sandwiched between one of the cathode plates 11a and the adjacent anode plate 13a. In this layered structure, when a voltage is not applied across the cathode member 11 and the anode member 13, the wiring portions 11b that interconnect the adjacent cathode plates 11a and the wiring portions 13b that interconnect the adjacent anode plates 13a are bent to some extent toward the radially outer side of the contraction-type PVC gel actuator 10. By doing this, the plurality of cathode plates 11a that are connected to each other using the wiring portions 11b and the plurality of anode plates 13a that are connected to each other using the wiring portions 13b form a bellows shape. As illustrated in FIGS. 1B and 2A, the wiring portions 11b and the wiring portions 13b are disposed in outer circumferential directions of the cathode member 11 and the anode member 13, respectively. The wiring portions 11b and the wiring portions 13b are alternately disposed at positions spaced apart from one another by 90 degrees.

As illustrated in FIG. 1A, in the housing portion 56, a retaining plate 58 is provided at a position opposite an end portion of the contraction-type PVC gel actuator 10 on the side opposite to the plunger 33. The retaining plate 58 is disposed between the end portion of the contraction-type PVC gel actuator 10 and a base portion 55a of the inner case 55. The retaining plate 58 retains the end of the contraction-type PVC gel actuator 10 in the housing portion 56. By doing this, the contraction-type PVC gel actuator 10 is disposed in the housing portion 56 while being compressed to some extent in the axial direction, and is assembled in the housing portion 56 while applying a specified preset load to the plunger 33 and the ball valve 31. A terminal portion 59 is provided in the base portion 55a of the inner case 55. The terminal portion 59 is connected to external terminals (not shown) in order to supply power to the contraction-type PVC gel actuator 10.

As illustrated in FIGS. 1A to 1C, groove portions 57 are formed in an inner side surface of the housing portion 56 in order to house the wiring portions 11b and 13b. The groove portions 57 are linear thin grooves that extend in a stacking direction of the PVC gel layers 15. The groove portions 57 are formed at positions corresponding to the wiring portions 11b and 13b. The groove portions 57 house the wiring portions 11b and 13b that are bent from an outer circumferential surface of the contraction-type PVC gel actuator 10 toward the radially outer side. The wiring portions 11b and 13b housed in the groove portions 57 as described above function as stoppers that stop rotation of the cathode plates 11a and the anode plates 13a. This can prevent the cylindrical contraction-type PVC gel actuator 10 from rotating inside the cylindrical housing portion 56.

Figure 3A:
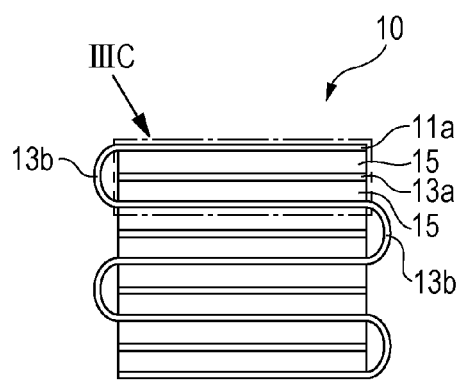
FIGS. 3A to 3D illustrate an operation of the contraction-type PVC gel actuator.
Figure 3B:
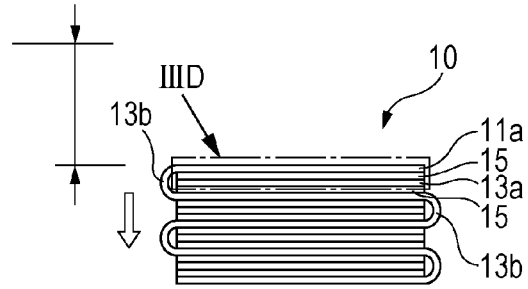
Figure 3C:
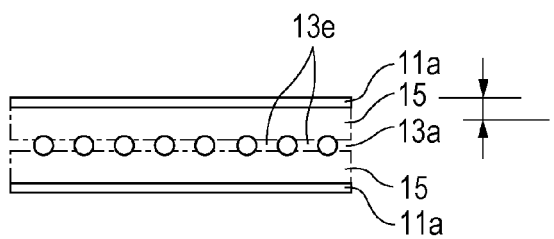
Figure 3D:
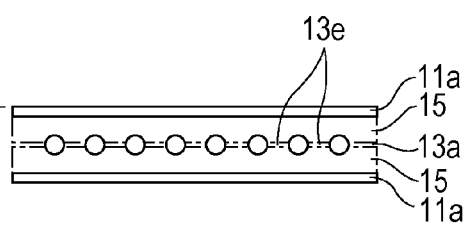

FIGS. 3A to 3D illustrate an operation of the contraction-type PVC gel actuator 10. FIG. 3A illustrates a state in which a voltage is not applied to the contraction-type PVC gel actuator 10, and FIG. 3B illustrates a state in which a voltage is applied to the contraction-type PVC gel actuator 10. FIG. 3C is an enlarged view of section 111C in FIG. 3A, and FIG. 3D is an enlarged view of section 111D in FIG. 3B. In the contraction-type PVC gel actuator 10 having the above-described structure, when a specified voltage is applied across the cathode member 11 and the anode member 13 in states illustrated in FIGS. 3A and 3C, the PVC gel layers 15 sandwiched between the cathode plates 11a and the anode plates 13a move toward the anode plate 13a sides. In so doing, since each anode plate 13a has a mesh-like structure, the PVC gel layer 15 deforms and enters gaps 13e of the mesh-like structure as illustrated in FIG. 3D. Thus, as illustrated in FIG. 3B, the height dimension of the contraction-type PVC gel actuator 10 in the stacking direction decreases (becomes thinner) compared to a state in which a voltage is not applied. When the application of a voltage is stopped, the PVC gel layers 15 return to a state that existed before a voltage was applied, and accordingly, the height dimension of the contraction-type PVC gel actuator 10 in the stacking direction is returned to the dimension that existed before a voltage was applied.

Figure 4A:
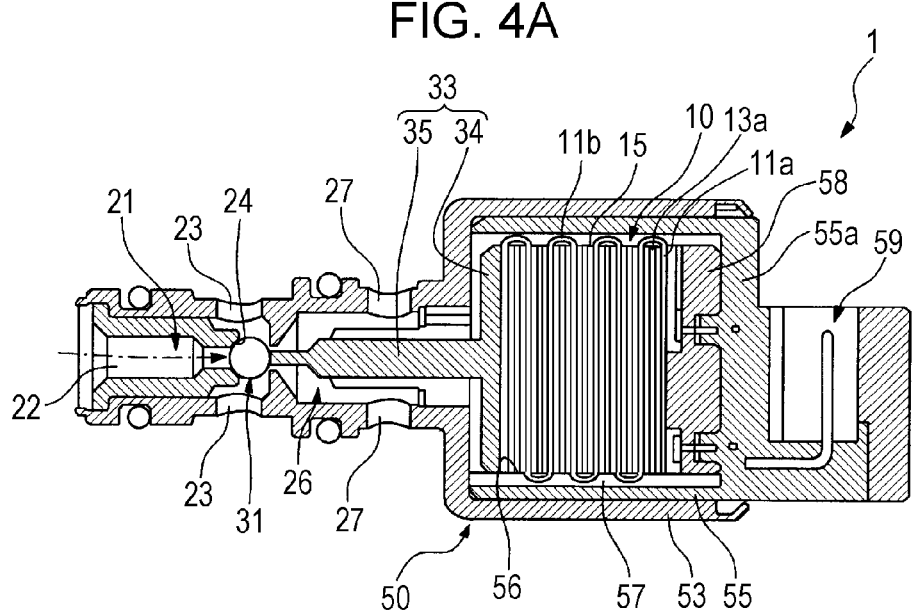
FIGS. 4A and 4B illustrate an operation of the valve device.
Figure 4B:
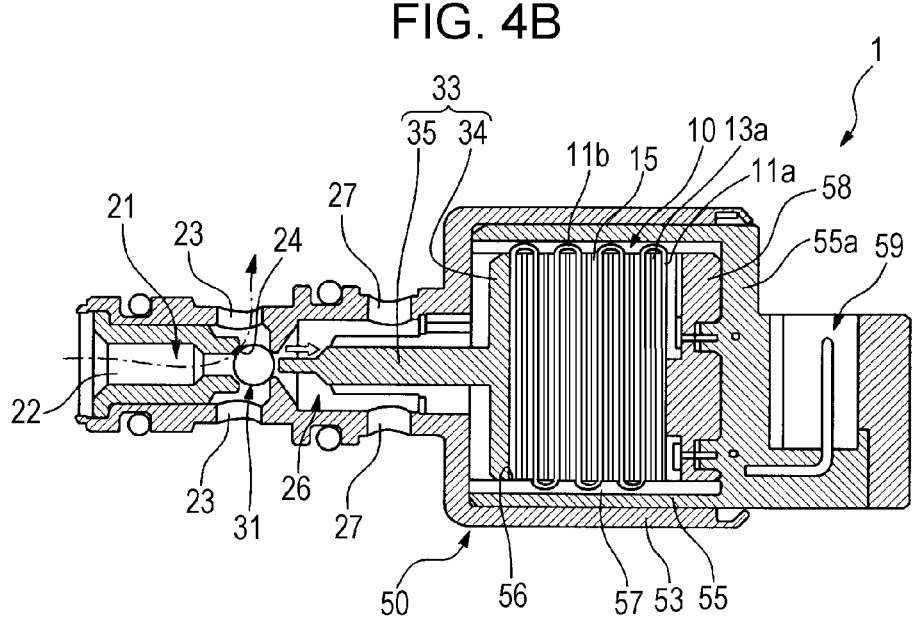

In the valve device 1 according to the present embodiment, the ball valve 31 is driven using the contraction-type PVC gel actuator 10 having the above-described characteristics, thereby opening or closing the oil path 21. FIGS. 4A and 4B illustrate an operation of the valve device 1. FIG. 4A illustrates a state in which the oil path 21 is closed when no voltage is applied to the contraction-type PVC gel actuator 10, and FIG. 4B illustrates a state in which the oil path 21 is opened when a voltage is applied to the contraction-type PVC gel actuator 10.

Specifically, when no voltage is applied to the contraction-type PVC gel actuator 10 as illustrated in FIG. 4A, the ball valve 31 sits on the valve seat portion 24 in the oil path 21 due to a preset load applied from the contraction-type PVC gel actuator 10 to the plunger 33 and the ball valve 31. Thus, the oil path 21 is closed. In contrast, when a voltage is applied to the contraction-type PVC gel actuator 10, the height dimension of the contraction-type PVC gel actuator 10 in the stacking direction decreases. This releases the present load applied from the contraction-type PVC gel actuator 10 to the plunger 33 and the ball valve 31. Accordingly, the ball valve 31 moves in a direction in which the ball valve 31 moves away from the valve seat portion 24 due to an oil pressure of the hydraulic fluid in the inlet port 22. Thus, the ball valve 31 moves away from the valve seat portion 24, thereby opening the oil path 21. When the application of a voltage to the contraction-type PVC gel actuator 10 is stopped in this state, the contraction-type PVC gel actuator 10 returns to the shape that existed before a voltage was applied. Thus, as illustrated in FIG. 4A, the ball valve 31 sits on the valve seat portion 24 due to the preset load, thereby closing the oil path 21. As described above, the contraction-type PVC gel actuator 10 mounted in the valve device 1 contracts or expands depending on whether or not there is a voltage applied thereto, thereby opening or closing the oil path 21 in the valve device 1.

In the valve device 1 according to the present embodiment, it is desirable that a specific set value of a voltage to be applied to the contraction-type PVC gel actuator 10 be determined with consideration of an output force (a load) required to drive the ball valve 31. It is also desirable that the number of PVC gel layers 15 stacked in the contraction-type PVC gel actuator 10 be determined with consideration of displacement (movement amount) of the ball valve 31 required to open and close the oil path 21.

As described above, the valve device 1 according to the present embodiment includes the contraction-type PVC gel actuator 10, in which the plurality of planar cathode plates 11a and the plurality of mesh-like anode plates 13a are alternately stacked one on top of the other with the PVC gel layers 15 sandwiched therebetween. With expansion or contraction deformation of the contraction-type PVC gel actuator 10, the ball valve 31 is driven so as to close or open the oil path 21. In addition, the adjacent cathode plates 11a included in the contraction-type PVC gel actuator 10 are connected to each other using the wiring portions 11b such that the plurality of cathode plate 11a form the cathode member 11, and the adjacent anode plates 13a included in the contraction-type PVC gel actuator 10 are connected to each other using the wiring portions 13b such that the plurality of anode plates 13a form the anode member 13.

As described above, in the valve device 1 according to the present embodiment, the plurality of cathode plates 11a and the plurality of anode plates 13a included in the contraction-type PVC gel actuator 10 are respectively connected to each other using the wiring portions 11b and the wiring portions 13b so as to be integrated. Thus, the cathode member 11 that includes the cathode plates 11a and the wiring portions 11b, and the anode member 13 that includes the anode plates 13a and the wiring portions 13b can be respectively formed as integrated units by pressing. Thus, the valve device 1 equipped with the contraction-type PVC gel actuator 10 that includes the plurality of cathode plates 11a and the plurality of anode plates 13a can be fabricated in a simple process and at a low cost.

In addition, the contraction-type PVC gel actuator 10 has a simpler structure, a reduced size, and is lighter in weight compared to a solenoid. For this reason, the valve device 1 according to the present embodiment, which includes the contraction-type PVC gel actuator 10 having the above-described structure as an actuator to drive the ball valve 31, can have a much simpler structure and a much reduced size, can be much lighter in weight, and can be fabricated at a lower cost compared to a related-art valve device including the solenoid actuator. In particular, an automatic transmission installed in a vehicle uses a plurality of valve devices for hydraulic control. Thus, the use of the valve device 1 according to the present embodiment having the above-described structure in the automatic transmission can significantly help reduce the sizes, weights, and costs of the automatic transmission and the vehicle. In the valve device 1 according to the present embodiment, the ball valve 31 is driven due to expansion and contraction deformation of the contraction-type PVC gel actuator 10. This eliminates or significantly reduces operational noise generated when the oil path 21 is opened or closed. Thus, the valve device 1 is very quiet in operation.

In the valve device 1 according to the present embodiment, since the wiring portions 11b and 13b are bent toward the radially outer side, the plurality of cathode plates 11a and the plurality of anode plates 13a that are respectively connected to each other using the wiring portions 11b and 13b form a bellows shape. This allows the cathode plates 11a and the anode plates 13a to follow deformation of the PVC gel layers 15. Thus, expansion and contraction deformation of the contraction-type PVC gel actuator 10 can be smoothly performed, and the valve device 1 having good operability and durability can be obtained. Since the wiring portions 11b and 13b are bent, there is no possibility of excessive tension being applied to the wiring portions 11b and 13b when the PVC gel layers 15 deform. Thus, breaks and other problems in the wiring portions 11b and 13b that would occur due to expansion and contraction deformation of the contraction-type PVC gel actuator 10 can be prevented from occurring.

In the valve device 1 according to the present embodiment, the groove portions 57 are formed at positions corresponding to the wiring portions 11b and 13b in the inner side surface of the housing portion 56. These groove portions 57 house the wiring portions 11b and 13b that are bent from the outer circumferential surface of the contraction-type PVC gel actuator 10 toward radially outer side. With this structure, the wiring portions 11b and 13b housed in the groove portions 57 function as stoppers that stop rotation of the cathode plates 11a and the anode plates 13a. This can prevent the cylindrical contraction-type PVC gel actuator 10 from rotating in the cylindrical housing portion 56. Thus, breaks and other problems in the wiring portions 11b and 13b that would occur due to rotation of the contraction-type PVC gel actuator 10 in the housing portion 56 can be effectively prevented.

In the valve device 1 according to the present embodiment, the groove portions 57, which house the wiring portions 11b and 13b, also function as flow paths through which fluids such as the hydraulic fluid and air having entered the housing portion 56 flow. This allows, when expansion or contraction deformation of the contraction-type PVC gel actuator 10 is performed, fluids such as the hydraulic fluid and air in the housing portion 56 to smoothly move. This also allows the hydraulic fluid and air to be delivered entirely in the housing portion 56 through the groove portions 57. Thus, expansion and contraction deformation of the contraction-type PVC gel actuator 10 can be more smoothly performed.

Although the embodiment of the present invention has been described, the present invention is not limited to the above-described embodiment. A variety of modifications are possible without departing from the technical concepts according to an aspect of the present invention or the technical concepts described in the description and illustrated in the drawings.

What is claimed is:

1. A valve device comprising:
    a fluid path through which a fluid passes;
    a valve member that opens and closes the fluid path;
    a contraction-type polymer gel actuator that includes
        a plurality of planar cathode plates,
        a plurality of mesh-like anode plates, and
        polymer gel layers; and
    a case including the fluid path, a substantially cylindrical housing portion, a groove portion, and a drain chamber to receive an excess fluid from the fluid path, the drain chamber including an entrance opening facing the valve member, wherein the plurality of cathode plates and the plurality of anode plates are alternately stacked one on top of the other with the polymer gel layers sandwiched therebetween, wherein the contraction-type polymer gel actuator includes a substantially cylindrical outer shape having an axial direction aligned with an alternate stack direction of the plurality of cathode plates and the plurality of anode plates, wherein, in the valve device, the fluid path is opened and closed by driving the valve member, the valve member being driven due to expansion and contraction deformation of the contraction-type polymer gel actuator, the expansion and contraction deformation of the contraction-type polymer gel actuator occurring due to control of a voltage applied to the contraction-type polymer gel actuator, wherein, the cathode plates adjacent to each other are connected to each other using a belt-like wiring portion, the connected plurality of cathode plates forming an integrated cathode member, wherein, the anode plates adjacent to each other are connected to each other using a belt-like wiring portion, the connected plurality of anode plates forming an integrated anode member, wherein the substantially cylindrical housing portion houses the substantially cylindrical contraction-type polymer gel actuator, and the groove portion is disposed on an inner side of the housing portion to house the belt-like wiring portion of the contraction-type polymer gel actuator and serve as a flow path for a second fluid moving in the housing portion, wherein the contraction-type polymer gel actuator is housed in the housing portion while being compressed in the axial direction so as to apply a preset load to the valve member such that the fluid path is closed by the valve member and the entrance opening of the drain chamber is opened, and wherein, by applying the voltage to the contraction-type polymer gel actuator, the preset load applied to the valve member is released to open the fluid path and close the entrance opening of the drain chamber.

2. The valve device according to claim 1,
wherein the wiring portions of the cathode member and the anode member respectively interconnect the adjacent cathode plates and the adjacent anode plates while the wiring portions are bent.

3. The valve device according to claim 1,
wherein the entrance opening of the drain chamber is disposed opposite to the fluid path along a linear moving direction of the valve member.

4. A valve device comprising:
a fluid path through which a fluid passes;
a valve member that opens and closes the fluid path; and
a contraction-type polymer gel actuator that includes
a plurality of planar cathode plates,
a plurality of mesh-like anode plates, and
polymer gel layers, wherein the plurality of cathode plates and the plurality of anode plates are alternately stacked one on top of the other with the polymer gel layers sandwiched therebetween, wherein, in the valve device, the fluid path is opened and closed by driving the valve member, the valve member being driven due to expansion and contraction deformation of the contraction-type polymer gel actuator, the expansion and contraction deformation of the contraction-type polymer gel actuator occurring due to control of a voltage applied to the contraction-type polymer gel actuator, wherein, the cathode plates adjacent to each other are connected to each other using a belt-like wiring portion such that a first cathode plate and a second cathode plate are connected to each other via a first belt-like cathode wiring portion, and the second cathode plate and a third cathode plate are connected to each other via a second belt-like cathode wiring portion, the connected plurality of cathode plates forming an integrated cathode member, wherein, the anode plates adjacent to each other are connected to each other using a belt-like wiring portion such that a first anode plate and a second anode plate are connected to each other via a first belt-like anode wiring portion, and the second anode plate and a third anode plate are connected to each other via a second belt-like anode wiring portion, the connected plurality of anode plates forming an integrated anode member, wherein the integrated cathode member is bent in a meander shape such that the first cathode plate, the first belt-like cathode wiring portion, and the second cathode plate form a first U-shape and the second cathode plate, the second belt-like cathode wiring portion, and the third cathode plate form a second U-shape, wherein the integrated anode member is bent in a meander shape such that the first anode plate, the first belt-like anode wiring portion, and the second anode plate form a third U-shape and the second anode plate, the second belt-like anode wiring portion, and the third anode plate form a fourth U-shape.

5. The valve device according to claim 4,
wherein the wiring portions of the cathode member and the anode member respectively interconnect the adjacent cathode plates and the adjacent anode plates while the wiring portions are bent.

6. The valve device according to claim 4,
wherein the integrated cathode member is bent in the meander shape such that the first belt-like cathode wiring portion and the second belt-like cathode wiring portion are disposed opposite to each other,
wherein the integrated anode member is bent in the meander shape such that the first belt-like anode wiring portion and the second belt-like anode wiring portion are disposed opposite to each other, and
wherein the integrated cathode member and the integrated anode member are disposed such that a first imaginary line connecting the first belt-like cathode wiring portion and the second belt-like cathode wiring portion intersects a second imaginary line connecting the first belt-like anode wiring portion and the second belt-like anode wiring portion in a plan view showing a top of the stack of the cathode plates and the anode plates.

7. The valve device according to claim 6,
wherein the first imaginary line and the second imaginary line intersect at a right angle.

\* \* \* \* \*